US008661293B2

(12) United States Patent
del Rosario et al.

(10) Patent No.: US 8,661,293 B2
(45) Date of Patent: Feb. 25, 2014

(54) TEST ARCHITECTURE BASED ON INTELLIGENT TEST SEQUENCE

(75) Inventors: Francis E. del Rosario, Rochester, MN (US); Jie Li, Shenzhen (CN); Antoine G. Sater, Rochester, MN (US); Hong Ye, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/174,475

(22) Filed: Jun. 30, 2011

(65) Prior Publication Data

US 2013/0007525 A1 Jan. 3, 2013

(51) Int. Cl.
*G06F 11/00* (2006.01)
(52) U.S. Cl.
USPC .............................................. 714/33; 714/39
(58) Field of Classification Search
USPC .................. 714/33, 30, 31, 32, 35, 37, 39
See application file for complete search history.

(56) References Cited

U.S. PATENT DOCUMENTS

| 4,630,224 A | 12/1986 | Sollman |
| 4,841,456 A | 6/1989 | Hogan, Jr. et al. |
| 5,359,547 A * | 10/1994 | Cummins et al. ............. 702/119 |
| 6,052,265 A | 4/2000 | Zaretsky et al. |
| 6,574,761 B1 | 6/2003 | Abramovici et al. |
| 6,674,889 B1 | 1/2004 | Takayama |
| 6,728,914 B2 | 4/2004 | McCauley et al. |
| 7,017,095 B2 | 3/2006 | Forlenza et al. |
| 2002/0083386 A1 | 6/2002 | McCauley et al. |
| 2004/0010741 A1 | 1/2004 | Forlenza et al. |
| 2005/0039079 A1* | 2/2005 | Higashi et al. .................. 714/28 |
| 2005/0172267 A1* | 8/2005 | Bergin .......................... 717/124 |
| 2008/0010524 A1* | 1/2008 | Higashi et al. .................. 714/28 |

FOREIGN PATENT DOCUMENTS

| EP | 1521093 B1 | 1/2006 |
| JP | 11264857 A | 9/1999 |
| JP | 2005332555 A | 12/2005 |

* cited by examiner

*Primary Examiner* — Dieu-Minh Le
(74) *Attorney, Agent, or Firm* — Yee & Associates, P.C.; David A. Mims, Jr.

(57) ABSTRACT

A method, data processing system, and computer program product for testing a computer system. A sequencer tests the computer system using test modules arranged in a first sequence, wherein each of the test modules is for testing at least a portion of the computer system. The sequencer determines if an operator is available, in response to an interrupt generated by a test module. If an operator is available, the sequencer arranges the test modules into a second sequence based on a first policy. If an operator is unavailable, the sequencer arranges the test modules into a third sequence based on a second policy.

20 Claims, 4 Drawing Sheets

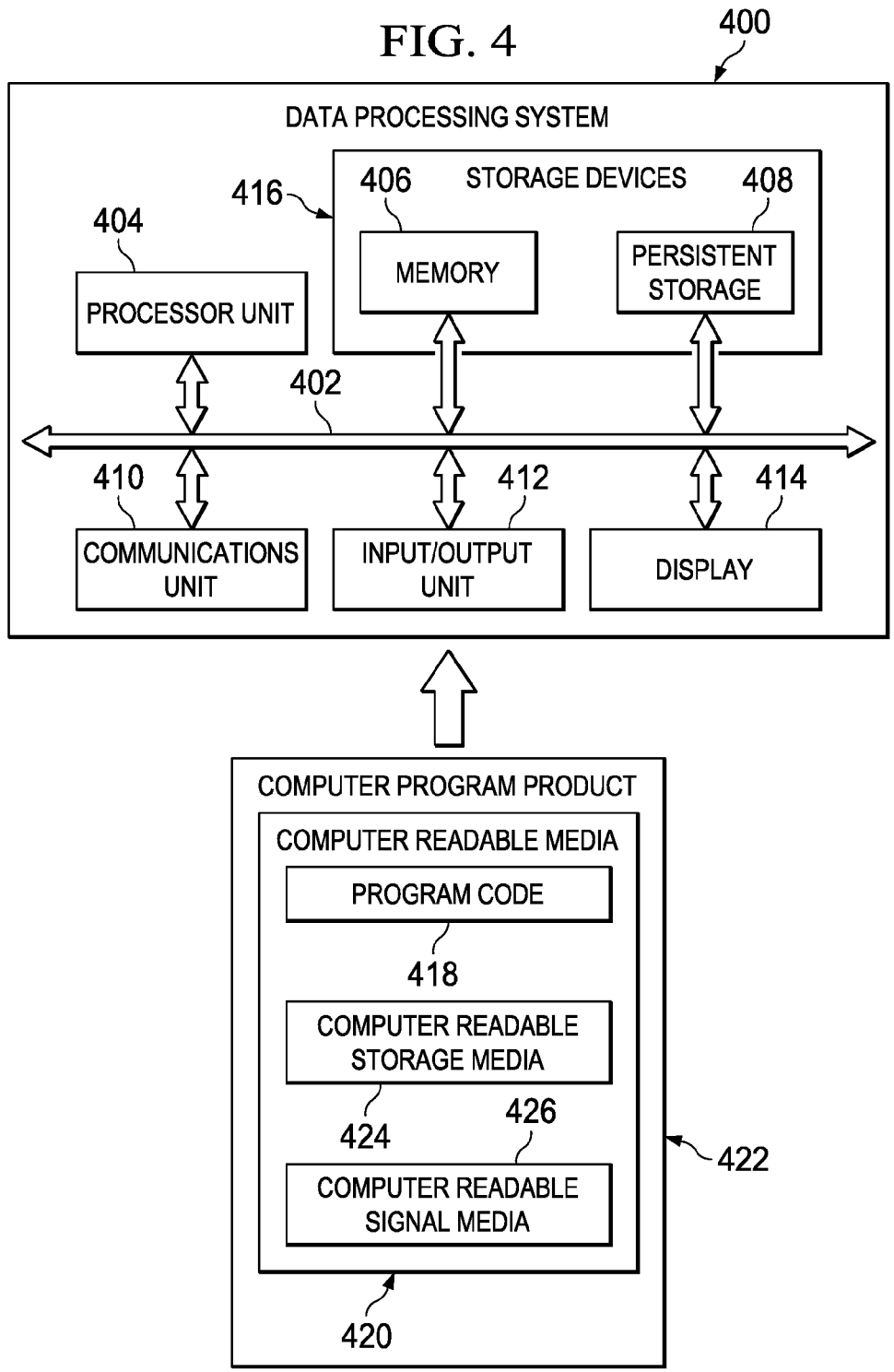

TEST ARCHITECTURE BASED ON INTELLIGENT TEST SEQUENCE

BACKGROUND

1. Field

The present disclosure relates generally to testing a computer system and, in particular, to a method and apparatus for arranging test modules for testing the computer system. Still more particularly, the present disclosure relates to a method and apparatus for arranging test modules for testing the computer system based on availability of an operator.

2. Description of the Related Art

Current industrial testing strategy of computer systems is based upon automatic sequential test processes. Hardware system testing is one of the most complicated and demanding portions of the manufacturing life cycle of computer systems. Hardware system testing may include configuration check, flash testing, functional testing, performance testing, software pre-loading, etc.

Modern test architecture for computer system testing is based on an automatic sequential test process. A computer system under test, also called a unit under test, undergoes a pre-defined test sequence. The test sequence includes a testing the computer system by executing a series of test modules in a particular order. Upon successful completion of the last test module in the series, the computer system testing is complete.

This method of sequential test has the advantages of being easy to implement and to control. However, there are shortcomings to this method. For example, if any test module in the sequence of test modules fails, then the computer system fails the test module and the testing ends or is suspended. An interrupt may indicate that the test module has failed. At that point, an operator may be available to determine why the test failed and to determine if testing may resume or begin again. An interrupt may also be generated when operator interaction is required for a particular test. The test maybe for example, loading a CD into a CD drive. However, an operator may not always be available. Moreover, efficiency, error rate, requirements, and skill level varies among operators.

SUMMARY

The different illustrative embodiments provide a method, data processing system, and computer program product for testing a computer system. A sequencer tests the computer system using test modules arranged in a first sequence, wherein each of the test modules is for testing at least a portion of the computer system. The sequencer determines if an operator is available, in response to an interrupt generated by a test module. If an operator is available, the sequencer arranges the test modules into a second sequence based on a first policy. If an operator is unavailable, the sequencer arranges the test modules into a third sequence based on a second policy.

BRIEF DESCRIPTION OF THE SEVERAL VIEWS OF THE DRAWINGS

FIG. 4 is an illustration of a data processing system in accordance with an illustrative embodiment.

DETAILED DESCRIPTION

Figure 1:
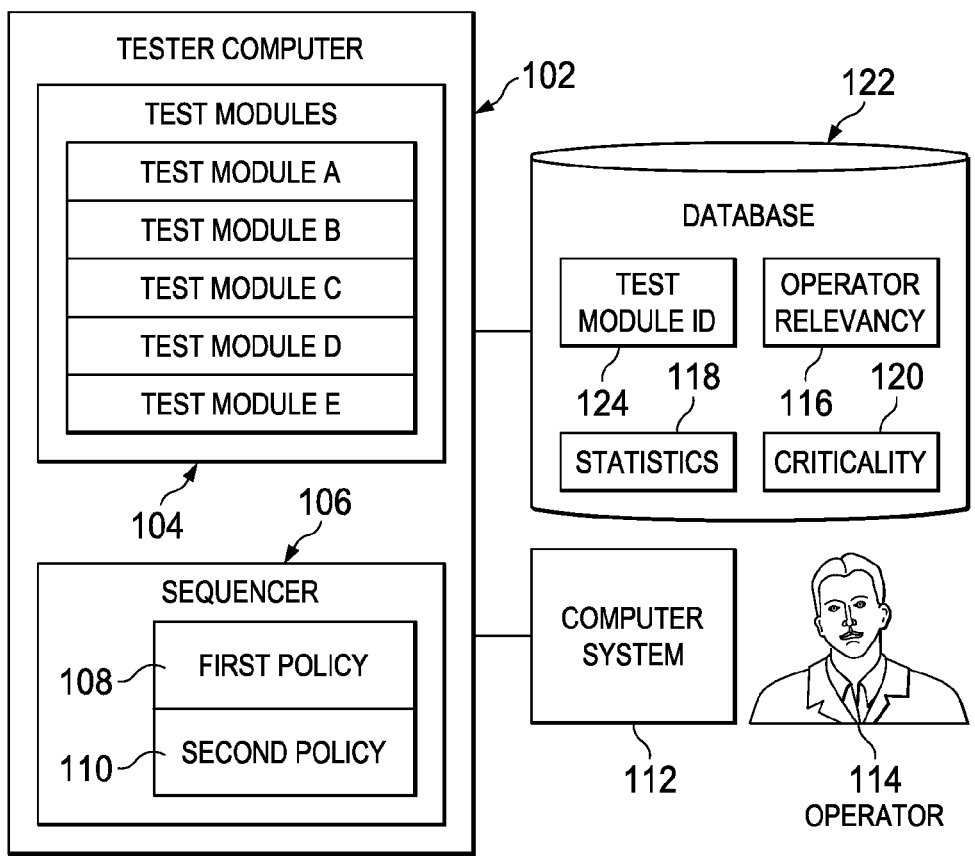
FIG. 1 is an illustration of a test environment in which illustrative embodiments may be implemented.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into account that currently, the ability for arranging test modules into different sequences depends on operator availability after receiving an interrupt is not available. The different illustrative embodiments recognize and take into account that arranging test modules into sequences based upon operator availability and operator relevancy may be desirable.

Thus, the different illustrative embodiments provide a method, data processing system, and computer program product for testing a computer system. A sequencer tests the computer system using test modules arranged in a first sequence, wherein each of the test modules is for testing at least a portion of the computer system. The sequencer determines if an operator is available, in response to an interrupt generated by a test module. If an operator is available, the sequencer arranges the test modules into a second sequence based on a first policy. If an operator is unavailable, the sequencer arranges the test modules into a third sequence based on a second policy.

With reference to FIG. 1, an illustration of a test environment is depicted in which illustrative embodiments may be implemented. In some illustrative examples, tester environment 100 may be implemented within a single computer, such as data processing system 400 in FIG. 4. In some illustrative examples, test environment 100 may be implemented within a group of computers. For example, tester computer may include a group of computers.

In these illustrative examples, tester computer 102 includes a sequence of test modules 104 and sequencer 106. Sequencer 106 includes first policy 108 and second policy 110, wherein each policy specifies a set of rules that determine the sequence of test modules 104 that is used for testing computer system 112. Sequencer 106 may be implemented as software, hardware, or as a combination of software and hardware. Furthermore, operator 114 is required during the process of testing computer system 112. Operator is a person capable of interacting with tester computer 102 and computer system 112.

In these illustrative examples, a test module in test modules 104 may generate an interrupt if an error is encountered during testing. An interrupt may also be generated if operator 114 is required to complete a particular portion of testing.

If operator 114 is available to respond to the interrupt, then sequencer 106 arranges the sequence of test modules 104 according to first policy 108. First policy 108 is a set of rules that are based upon at least one of operator relevancy 116, statistics 118, and criticality 120, which are stored in database 122. If operator 114 is not available to respond to the interrupt, then sequencer 106 arranges the sequence of test modules 104 according to second policy 110. Second policy 110 is a set of rules that are based upon at least one of operator relevancy 116, statistics 118, and criticality 120.

Operator relevancy 116, statistics 118, and criticality 120 may be associated with each individual test module in test modules 104. Therefore, database 122 also includes test module id 124 in order to associate data related to operator relevancy 116, statistics 118, and criticality 120 with each test module in test modules 104.

Operator relevancy 116 may specify a degree of dependency of a test module on the availability of operator 114 in order for the test module to successfully complete. Operator relevancy 116 may be a value specifying the degree of dependency. Operator relevancy 116 may be associated with each module in test modules 104. Furthermore, operator relevancy 116 may be changed or updated for a particular test module based upon statistics 118. Statistics 118 is data related to each test module regarding the performance of each test module during testing. Statistics 118 may include a start time and end time of each test module and additional data related to testing such as data related to operator 114, operator 114 availability, and tester computer 102.

Criticality 120 specifies whether a particular test module is necessary for testing to continue. In these illustrative examples, criticality 120 may be a value, a rule, a flag, and any other suitable indicator specifying the criticality of testing to continue. For example, if a test module is critical, then testing may not continue if the test module does not pass. In some illustrative examples, sequencer 106 may arrange critical test modules before non-critical test modules. Database 122 may specify additional data, such as an order of dependency between test modules 104. Thus, sequencer 106 may also arrange test modules 104 based on the order of dependency.

Furthermore, operator relevancy 116 may be based upon a degree of efficiency associated with operator 114 for each test module or all test modules 104. Degrees of efficiency may be based on the speed of operator 114 with respect to interacting and completing each test module and an error rate associated with operator 114 and each test module. Particularly, the degree of efficiency of operator 114 may be calculated by using statistics 118 to compare the speed and error rate of operator 114 with the speed and error rate of other operators.

Operator relevancy 116 may also be based upon power requirements associated with operator 114. The power requirements of operator 114 may be determined by multiplying the duration of time operator 114 took to perform each test module with a predetermined amount of power needed to run each test module. The power requirements for operator 114 may also be determined by using one or more devices configured to measure actual device power usage of one or more devices in use by operator 114 for each test module. For example, operator 116 may cause certain amounts of power to be used due to efficiency associated with operator 114. Moreover, operator 114 may require environmental-related power, such as lighting, temperature control, health-related equipment, or other environmental characteristics related to requirements of operator 114. Thus, sequencer 106 arranges test modules 104 based upon factors that affect cycle time, labor costs, and power consumption. For example, idle time may be reduced when test modules 104 are arranged in a new order.

Figure 2:
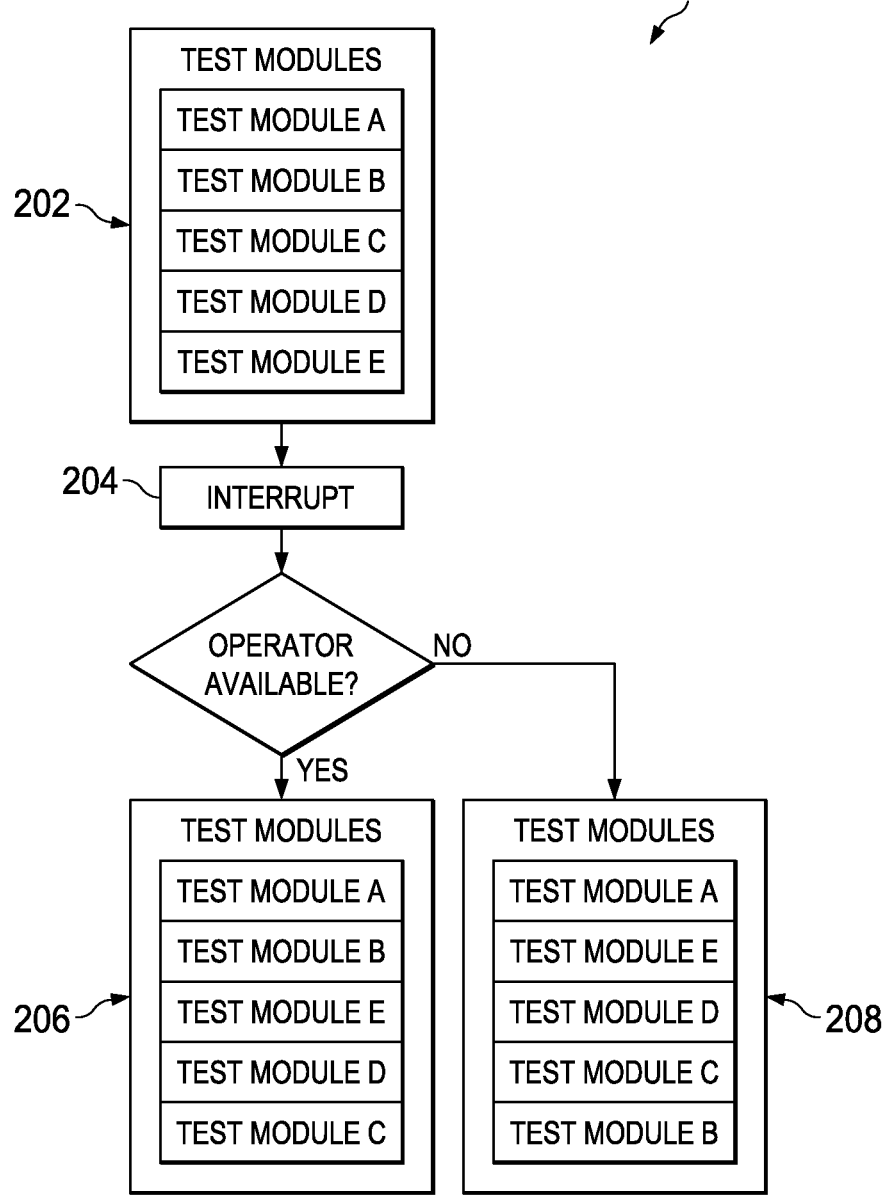
FIG. 2 is an illustration of a block diagram of a process for testing a computer system in accordance with an illustrative embodiment.

With reference now to FIG. 2, an illustration of a block diagram of a process for testing a computer system 200 is depicted in accordance with an illustrative embodiment. The block diagram illustrated in FIG. 2 may be implemented in a tester environment, such as tester environment 100 in FIG. 1.

Sequencer 106 tests computer system 112 using test modules 202 arranged in a first sequence. During testing, a test module generates interrupt 204. In response to generating interrupt 204, sequencer 106 determines if operator 114 is available. If operator 114 is available, sequencer 106 arranges test modules 202 into a new sequence of test modules 206 based on first policy 108. If operator 114 is unavailable, sequencer 106 arranges test modules 202 into a new sequence of test modules 208 based on second policy 110. First policy 108 and second policy 110 may be based on sets of rules, as described for FIG. 1.

For example, a first sequence of test modules 202 that makes up part of a "simple drawer" test may be in the following order: serial wrap plug test, processor test, memory/functional test, and preload customer purchased software. In this illustrative example, interrupt 204 occurs during the serial wrap plug test. In response to generating interrupt 204, sequencer 106 determines that operator 114 is unavailable. Sequencer 106 then rearranges test modules 202 according to second policy 108 into the following new sequence: processor test, memory/functional test, preload customer purchased software, and serial wrap plug test. Thus, the serial wrap plug test module is moved to the end of the sequence and testing continues with the processor test module. Moreover, if operator 114 becomes available while the other three test modules are running, the serial wrap plug test module may be debugged in parallel, minimizing delay and reducing test cycle time. Furthermore, if sequencer 106 determines that operator 114 is available after interrupt 204 occurs during the serial wrap plug test, then the sequence of test modules 202 may be arranged into the same or a different order, depending on second policy 108.

Figure 3:
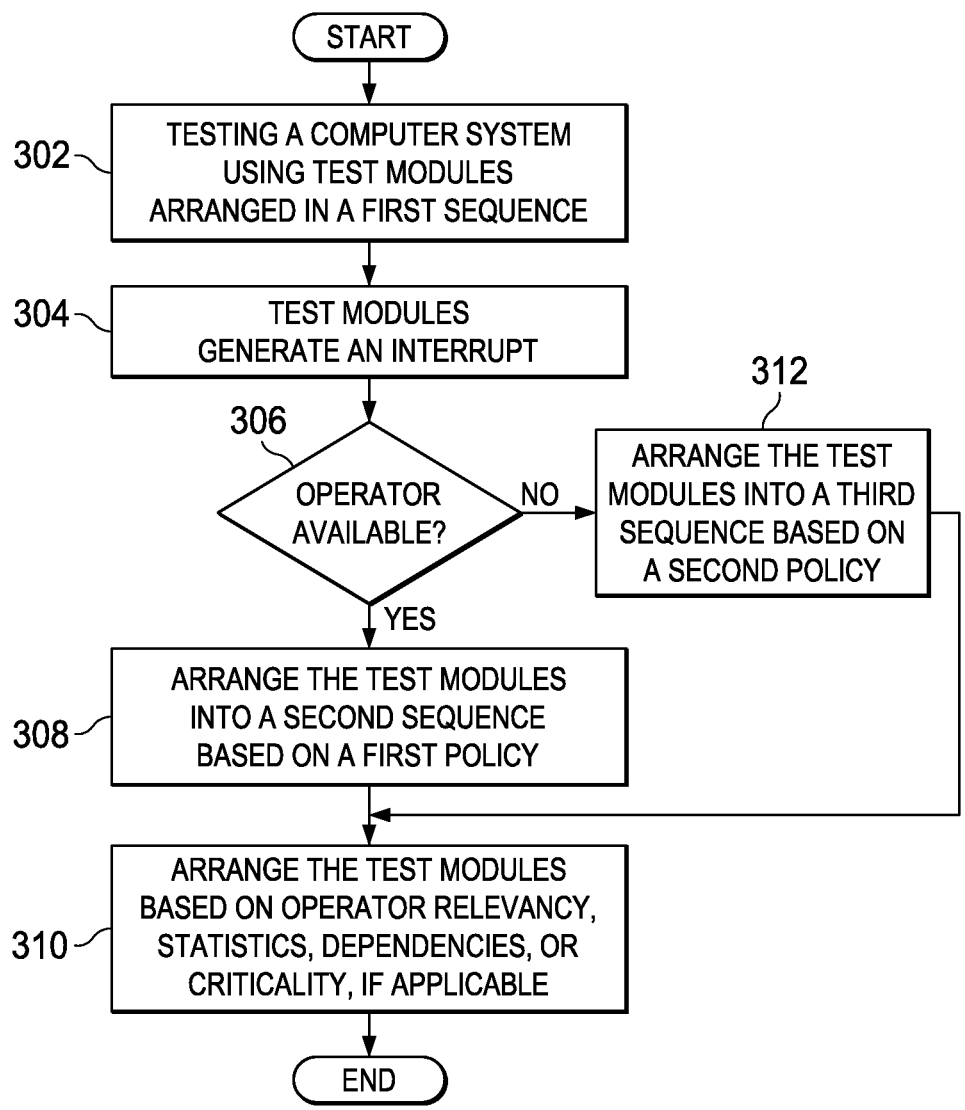
FIG. 3 is an illustration of a flowchart of a process for testing a computer system in accordance with an illustrative embodiment.

With reference now to FIG. 3, an illustration of a flowchart of a process for test a computer system is depicted in accordance with an illustrative embodiment. The process illustrated in FIG. 3 may be implemented in a tester environment, such as tester environment 100 in FIG. 1.

The process begins by testing a computer system 112 using test modules 104 arranged in a first sequence (step 302). The test modules 104 then generate an interrupt 204 (step 304). The process then determines if operator 114 is available (step 306). If operator 114 is available, the process arranges the test modules 104 into a second sequence based on a first policy 108 (step 308). The process then arranges the test modules 104 based on operator relevancy 116, statistics 118, dependencies, or criticality 120, if applicable (step 310). Thereafter, the process terminates.

Returning now to step 306, if operator 114 is unavailable, the process arranges the test modules 104 into a third sequence based on a second policy 110 (step 312). The process then arranges test modules 104 based on operator relevancy 116, statistics 118, dependencies, or criticality 120, if applicable (step 310). Thereafter, the process terminates.

Turning now to FIG. 4, an illustration of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414. Data processing system 400 is an example of one implementation for tester 104 and computer system 112 in tester environment 100 in FIG. 1.

Processor unit 404 serves to run instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 or run by processor unit 404. The processes of the different embodiments may be performed by processor unit 404 using computer implemented instructions, which may be located in a memory, such as memory 406.

These instructions are referred to as program code, computer usable program code, or computer readable program code that may be read and run by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 and run by processor unit 404. Program code 418 and computer readable media 420 form computer program product 422 in these examples. In one example, computer readable media 420 may be computer readable storage media 424 or computer readable signal media 426. Computer readable storage media 424 may include storage devices, such as, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage device, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 200 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for testing a computer system. A sequencer tests the computer system using test modules arranged in a first sequence, wherein each of the test modules is for testing at least a portion of the computer system. The sequencer determines if an operator is available, in response to an interrupt generated by a test module. If an operator is available, the sequencer arranges the test modules into a second sequence based on a first policy. If an operator is unavailable, the sequencer arranges the test modules into a third sequence based on a second policy.

One or more of the illustrative embodiments take into account operator availability and operator relevancy in order to arrange new sequences of test modules. Thus, a cycle time, labor costs, and efficiency continue to be improved over current processes. The illustrative embodiments may provide a more efficient testing process with fewer errors may be made and reduce cycle time. These results may save time and money.

For example, when an interrupt is received from a test module during testing of a computer system, a sequencer determines if an operator is available. If an operator is available, a sequence of test modules is arranged into a new sequence based upon a policy that takes into account operator relevancy and other test-related data including statistics. If an operator is unavailable, the sequence of test modules is arranged into a different sequence based upon a different policy that takes into account operator relevancy and other test-related data including statistics. Thus, the test process can be made much more efficient, allowing reductions in cycle time and labor costs associated with operators.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for testing a computer system, the method comprising:
   testing the computer system, by a sequencer, using test modules arranged in a first sequence, wherein each of the test modules is for testing at least a portion of the computer system;
   generating an interrupt by a test module, wherein the interrupt is generated in response to encountering an error during testing, or in response to the test module requiring an operator to complete a particular portion of testing;
   responsive to the interrupt generated by the test module in the modules, determining if the operator is available to respond to the interrupt;
   responsive to determining that the operator is available to respond to the interrupt, arranging, by the sequencer, the test modules into a second sequence based on a first policy; and
   responsive to determining that the operator is unavailable to respond to the interrupt, arranging, by the sequencer, the test modules into a third sequence based on a second policy.

2. The method of claim 1, wherein the test modules are arranged into the second sequence based upon a degree of operator relevancy with respect to each of the test modules.

3. The method of claim 2, wherein the degree of operator relevancy comprises a degree of efficiency associated with the operator.

4. The method of claim 2, wherein the degree of operator relevancy comprises a degree of power requirements associated with the operator.

5. The method of claim 1, wherein arranging the test modules into the second sequence and the arranging the test modules into the third sequence comprises arranging critical test modules before non-critical test modules.

6. The method of claim 1, wherein arranging test modules into the second sequence and arranging the test modules into the third sequence is based on testing history statistics of each of the test modules and a failure rate of each of the test modules.

7. The method of claim 1, wherein arranging the test modules into the second sequence and arranging the test modules into the third sequence is based on an order dependency between at least two of the test modules.

8. A data processing computer system comprising:
   a bus;
   a communications unit connected to the bus;
   a storage device connected to the bus, wherein the storage device includes program code; and
   a processor unit connected to the bus, wherein the processor unit is configured to run the program code to test the computer system, by a sequencer, using test modules arranged in a first sequence, wherein each of the test modules is for testing at least a portion of the computer system; generate an interrupt by a test module, wherein the interrupt is generated in response to encountering an error during testing, or in response to the test module requiring an operator to complete a particular portion of testing; determine if the operator is available to respond to the interrupt in response to the interrupt generated by the test module in the modules; arrange, by the sequencer, the test modules into a second sequence based on a first policy in response to determining that the operator is available to respond to the interrupt; and arrange, by the sequencer, the test modules into a third sequence based on a second policy in response to determining that the operator is unavailable to respond to the interrupt.

9. The data processing computer system of claim 8, wherein the test modules are arranged into the second sequence based upon a degree of operator relevancy with respect to each of the test modules.

10. The data processing computer system of claim 9, wherein the degree of operator relevancy comprises a degree of efficiency associated with the operator.

11. The data processing computer system of claim 9, wherein the degree of operator relevancy comprises a degree of power requirements associated with the operator.

12. The data processing computer system of claim 8, wherein arranging the test modules into the second sequence and arranging the test modules into the third sequence comprises arranging critical test modules before non-critical test modules.

13. The data processing computer system of claim 8, wherein arranging the test modules into the second sequence and arranging the test modules into the third sequence is based on testing history statistics of each of the test modules and a failure rate of each of the test modules.

14. The data processing computer system of claim 8, wherein arranging the test modules into the second sequence and arranging the test modules into the third sequence is based on an order dependency between at least two of the test modules.

15. A computer program product for testing a computer system comprising:
   a non-transitory computer readable storage device;
   program code, stored on the computer readable storage device, for testing the computer system, by a sequencer, using test modules arranged in a first sequence, wherein each of the test modules is for testing at least a portion of the computer system;
   program code, stored on the computer readable storage device, for generating an interrupt by a test module, wherein the interrupt is generated in response to encountering an error during testing, or in response to the test module requiring an operator to complete a particular portion of testing;

program code, stored on the computer readable storage device, for determining if the operator is available to respond to the interrupt in response to the interrupt generated by the test module in the modules;

program code, stored on the computer readable storage device, for arranging, by the sequencer, the test modules into a second sequence based on a first policy in response to determining that the operator is available to respond to the interrupt; and program code, stored on the computer readable storage device, for arranging, by the sequencer, the test modules into a third sequence based on a second policy in response to determining that the operator is unavailable to respond to the interrupt.

16. The computer program product of claim 15 wherein the test modules are arranged into the second sequence based upon a degree of operator relevancy with respect to each of the test modules.

17. The computer program product of claim 16 wherein the degree of operator relevancy comprises a degree of efficiency associated with the operator.

18. The computer program product of claim 16 wherein the degree of operator relevancy comprises a degree of power requirements associated with the operator.

19. The computer program product of claim 15 wherein arranging the test modules into the second sequence and arranging the test modules into the third sequence comprises arranging critical test modules before non-critical test modules.

20. The computer program product of claim 15 wherein arranging the test modules into the second sequence and arranging the test modules into the third sequence is based on one or more of testing history statistics of each of the test modules, failure rate of each of the test modules, and an order dependency between at least two of the test modules.

* * * * *